United States Patent [19]

McDaniel et al.

[11] 4,444,964
[45] Apr. 24, 1984

[54] POLYMERIZATION PROCESS USING PHOSPHATE SUPPORTED CHROMIUM CATALYST

[75] Inventors: Max P. McDaniel; Marvin M. Johnson, both of Bartlesville, Okla.

[73] Assignee: Phillips Petroleum Company, Bartlesville, Okla.

[21] Appl. No.: 423,596

[22] Filed: Sep. 27, 1982

Related U.S. Application Data

[62] Division of Ser. No. 221,877, Dec. 31, 1980, Pat. No. 4,364,842.

[51] Int. Cl.$^3$ .............................. C08F 4/02; C08F 4/24; C08F 4/78
[52] U.S. Cl. ..................................... 526/105; 502/152; 502/171; 526/106; 526/348.2; 526/348.5; 526/348.6; 526/352
[58] Field of Search ................................ 526/105, 106

[56] References Cited

U.S. PATENT DOCUMENTS

| | | | |
|---|---|---|---|
| 2,441,297 | 5/1948 | Stirton | 208/136 |
| 2,930,789 | 3/1960 | Kerber et al. | 526/106 |
| 3,271,299 | 9/1966 | Kearby | 208/114 |
| 3,280,167 | 10/1966 | Schwarzer | 260/465.3 |
| 3,320,331 | 5/1967 | Gaspar et al. | 260/683.3 |
| 3,325,504 | 6/1967 | Grasselli | 260/294.9 |
| 3,342,750 | 9/1967 | Kearby | 252/437 |
| 3,397,155 | 8/1968 | Naro et al. | 260/2 |
| 3,453,219 | 7/1969 | O'Hara | 252/432 |
| 3,531,471 | 9/1970 | Hartwimmer et al. | 260/239.3 |
| 3,649,523 | 3/1972 | Bertolacini et al. | 208/111 |
| 3,689,589 | 9/1972 | Reusser | 260/683.15 R |
| 3,697,550 | 10/1972 | Bayne et al. | 260/346.8 |
| 3,736,354 | 5/1973 | Yanagita et al. | 260/530 N |
| 3,803,204 | 4/1974 | Grasselli et al. | 260/465 C |
| 3,904,550 | 9/1975 | Pine | 252/437 |
| 3,947,433 | 3/1976 | Witt | 526/107 |
| 3,969,273 | 7/1976 | Brown et al. | 252/435 |
| 4,080,311 | 3/1978 | Kehl | 252/437 |
| 4,219,444 | 8/1980 | Hill et al. | 526/106 |

FOREIGN PATENT DOCUMENTS 845754 3/1977 Belgium .

*Primary Examiner*—Stanford M. Levin

[57] ABSTRACT

In accordance with one embodiment of this invention, a chromium catalyst supported on an aluminum phosphate-containing base is used in conjunction with a boron component either as a part of the base or as a cocatalyst. The resulting catalyst is unique both in its favorable sensitivity to molecular weight control agents such as hydrogen and in its ability to produce a fundamentally different olefin polymer. In accordance with another embodiment of this invention, the chromium is supported on a phosphate base produced using a melt of the aluminum salt.

20 Claims, 5 Drawing Figures

AS P/AL INCREASES:

1. ESCR DECREASES
2. FLEXURAL MODULUS INCREASES
3. DENSITY INCREASES
4. ACTIVITY AND MELT INDEX INCREASES TO A MAXIMUM AND THEN DECREASES WHILE SURFACE HYDROXYL CONTENT DECREASES INITIALLY AND THEN ESSENTUALLY LEVELS OFF.

POLYMERIZATION PROCESS USING PHOSPHATE SUPPORTED CHROMIUM CATALYST

CROSS REFERENCE TO RELATED APPLICATION

This is a divisional of copending application Ser. No. 221,877, filed Dec. 31, 1980, U.S. Pat. No. 4,364,842.

BACKGROUND OF THE INVENTION

This invention relates to a phosphate supported chromium catalyst for olefin polymerization.

Supported chromium oxide catalysts can be used to prepare olefin polymers in a hydrocarbon solution to give a product having excellent characteristics from many standpoints. Silica supported chromium oxide catalysts can also be used to prepare olefin polymers in a slurry system wherein the polymer is produced in the form of small particles of solid material suspended in a diluent. This process, frequently referred to as a particle-form process, has the advantage of being less complex. However, certain control operations which are easily carried out in the solution process are considerably more difficult in the particle-form process. For instance, in the solution process, control of the molecular weight can be effected by changing the temperture with lower molecular weight (higher melt flow) being obtained at the higher temperature. However, in the slurry process, this technique is inherently limited since any efforts to increase the melt flow to any appreciable extent by increasing temperature would cause the polymer to go into solution and thus destroy the slurry or particle-form process. It is known to extend the range of melt flow capability of a given catalyst through the use of hydrogen. However, it has not heretofore been commercially feasible to produce a complete spectrum of polymers so far as melt flow is concerned in a slurry system with a single chromium catalyst system. Also, it is frequently desired to have a polymer with greater shear response than is normally obtained in the slurry or particle-form process.

While it has long been known to use phosphates as supports for chromium olefin polymerization catalysts, such supports have never achieved commercial success. Thus chromium catalysts are generally supported on silica-containing bases similar to those used decades ago when the chromium catalyzed polymerization of olefin polymers first became commercial.

SUMMARY OF THE INVENTION

It is an object of this invention to provide a catalyst capable of giving both high melt flow and higher shear response;

It is a further object of this invention to provide a catalyst suitable for use in slurry polymerization systems;

it is yet a further object of this invention to provide a catalyst capable of giving polymer suitable for blow molding and other applications requiring good melt strength;

it is yet a further object of this invention to provide a catalyst capable of producing olefin polymers having unexpectedly high flexural modulus;

It is yet a further object of this invention to provide a single catalyst system capable of giving a broad spectrum of polymers so far as melt flow is concerned;

It is a further object of this invention to provide an improved phosphate supported chromium catalyst system for olefin polymerization;

It is yet a further object of this invention to provide a catalyst system having unusual sensitivity to molecular weight control agents such as hydrogen;

It is still yet a further object of this invention to produce a novel olefin polymer definable in terms of a combination of physical properties without resort to the method used to produce it; and It is still yet a further object of this invention to produce a thermoplastic polymer having resistance to stress cracking which is an order of magnitude greater than would be expected for a given density or flexural modulus.

In accordance with one embodiment of this invention, a chromium catalyst supported on an aluminum phosphate-containing base is used in conjunction with a boron component either as a part of the base or as a cocatalyst. In accordance with a second embodiment of this invention, a chromium catalyst is supported on a phosphate-containing base prepared by combining a molten aluminum salt with phosphoric acid or a phosphoric acid salt and then forming aluminum phosphate which is recovered and activated by calcining in air.

DESCRIPTION OF THE PREFERRED EMBODIMENTS

Figure 1:
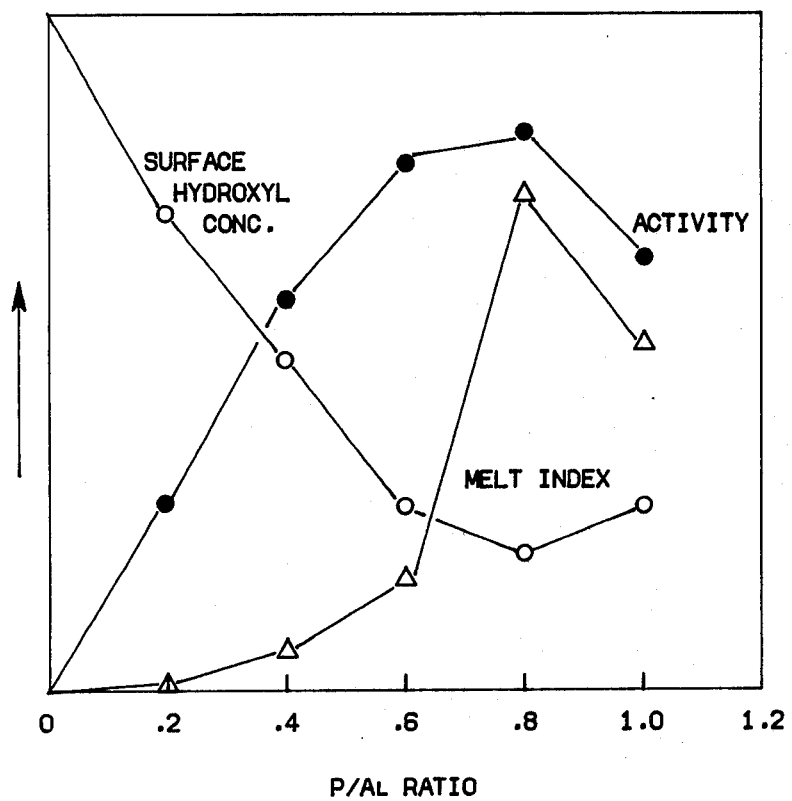
FIG. 1 is a plot showing the relationship of (1) surface hydroxyl concentration, (2) activity, and (3) melt index, to aluminum to phosphorus ratio.

Any suitable method can be used to prepare the base. Three suitable methods are set out hereinafter. First, conventional techniques as disclosed in Hill et al, U.S. Pat. No. 4,219,444, the disclosure of which is hereby incorporated by reference can be used. In this method an aluminum salt is combined with a source of phosphate ions in an aqueous medium and neutralized with a neutralizing agent to give a hydrogel. Alternatively, a polar organic solvent can be used. The second method for forming the base of the catalyst system of this invention is to combine an aluminum alkoxide with phosphoric acid to give a hydrogel directly, as disclosed in Pine, U.S. Pat. No. 3,904,550, the disclosure of which is hereby incorporated by reference. Third, an aluminum salt which will melt can be used, with the source of phosphate ions combined with the melt and then neutralized to give the hydrogel. Generally those aluminum salts with a sufficiently low melting point are hydrated. Orthophosphoric acid, orthophosphates such as monoammonium phosphate and diammonium hydrogen phosphate or mixtures of monoammonium and diammonium phosphate are preferred sources of phosphate ions. The scope of the phosphate ion source can be the same as in the first method. In a variation of this third method, a concentrated syrup of an aluminum salt is used. Thus, the third method can be broadly viewed as employing a concentrated mass of the acid phase (source of aluminum and source of orthophosphate ions). Alternatively, in method three and possibly method one, the aluminum-phosphate composition can be only partially neutralized and allowed to sit as a strongly acid composition until gellation occurs spontaneously.

In the preparations involving an aqueous medium, it is preferred to remove water by azeotropic distillation or by washing with a volatile, water miscible, low surface tension organic liquid. In the techniques not employing water or a solvent, any small amount of water carried over from water of hydration or from the base used in the neutralization can be removed by conventional spray drying, tray drying or oven drying, thus avoiding the necessity for azeotropic distillation. However, even in these situations, if it is desired to water wash the hydrogel, then azeotropic distillation or washing with a volatile oxygen containing water miscible solvent is desirable. After drying of water in this manner, the gel is preferably dried of solvent under mild conditions, for instance by heating at a temperture of 25° to 110° C., most preferably under vacuum.

It may be desirable in some instances to coprecipitate other materials with the phosphate or have other materials present during the gellation. For instance, the chromium compound such as chromium nitrate can be introduced with the reactants, as can a silicon component such as Si(OEt)$_4$.

It is frequently preferred that a small amount of a boron compound such as B(OH)$_3$ be introduced into the melt to be coprecipitated with the aluminum phosphate. Other suitable boron compounds include borates such as ammonium borate. By coprecipitated as it relates to the boron compound, it is meant that the aluminum phosphate is formed into a true hydrogel in the presence of the boron compound. It is not known to what extent the borate becomes incorporated into the hydrogel structure. The amount of boron compound present when the aluminum phosphate is gelled can vary widely but it isgenerally used in an amount so as to give about 1 to 30 mole percent boron compound based on the moles of phosphate.

The neutralization in the first and third methods can be carried out either by adding the acid phase to the base phase or vice versa (or by adding both to a third vessel). One suitable practice is to drip the acid phase into the base phase. This results in the production of small spheres or balls of the orthophosphate, particularly with the third method where the melt of aluminum salt and source of phosphate ions is dripped or sprayed or otherwise slowly added to a large excess of ammonium hydroxide. The spheres are subsequently collected, washed, dried and calcined.

Gellation occurs spontaneously at a pH of about 4, which is achieved by combining about 72 percent of the neutralizing agent, and it has been found, particularly in technique three, that this is undesirable. Therefore, neutralization is preferably achieved by either; (1) combining slowly with stirring about 72 percent of the amount of neutralizing agent needed for complete neutralization and thereafter quickly adding the rest so as to achieve gellation at a pH of 5 or greater, preferably at least 6, generally 6 to 10, or (2) combining 60 to 70 percent of the neutralizing agent needed for complete neutralization and aging until gellation occurs which will generally be 1 minute to 48 hours, more generally 5 minutes to 10 hours, more generally 10 minutes to 3 hours; thus, gellation occurs at a pH below 4, generally about 2. While any base can be used, concentrated ammonium hydroxide, ammonia gas, or ammonia dissolved in an alcohol or other non-aqueous solvent are preferred. Other suitable neutralizing agents include ammonium carbonate used alone or in combination, ethylene oxide and propylene oxide. Alternatively, in techniques one and three, particularly one, the phosphate can be in the nautralizing agent.

The chromium can be coprecipitated as noted hereinabove or can be added to the hydrogel. For example, a water soluble chromium compound, such as chromium nitrate, chromium acetate, or CrO$_3$ can be added to the hydrogel. Alternatively, a chromium compound soluble in an anhydrous solvent such as hydrocarbon can be used to impregnate the xerogel prior to activation. Suitable chromium compounds for such anhydrous impregnation include tertiary-butyl chromate. The chromium compounds are used in amounts sufficient to give 0.001 to 10, preferably 0.1 to 5, more preferably about 1 weight percent chromium based on the weight of the xerogel base. (The term xerogel is used to refer to the predominantly amorphous gel resulting from the removal of free water from the hydrogel.)

The activation of the thus-formed xerogel can be carried out at a lower temperature than is generally required for activating silica-based chromium catalysts which is a major advantage for the invention. Temperatures of 150°-800° C., preferably 300°-800° C., more preferably 300°-600° C., are suitable. The activating ambient can be any oxidizing ambient but for convenience and economy, an oxygen-containing ambient such as air is preferred. The chromium is at least predominantly in the hexavalent state after activation. If an excess of chromium over what is required is used, the excess may not be in the hexavalent state, if it remains on the catalyst at all. Times of 5 minutes to 24 hours, preferably 0.5 to 10 hours, are suitable for the activation or calcining step. The chromium is thought to be reduced in the polymerization zone by the monomer, probably to plus two oxidation state. If desired, this reduction may be carried out before the catalyst is contacted with the monomer, for instance in the activator.

The aluminum and phosphorus components are selected so as to give an atom ratio of phosphorus to aluminum within the range of 0.2:1 to 1:1, preferably 0.6:1 to 0.9:1. FIG. 1 shows the relationship between aluminum to phosphorus atom ratio and activity and melt index. Ratios above 1 are undesirable because the xerogel tends to be crystalline as opposed to amorphous and because excess phosphorus may deactivate the chromium.

Based on superior results obtained with triethylborane and tri-n-butyl borane, the boron cocatalyst is preferably a trihydrocarbylborane, more preferably a trialkylborane, the alkyl groups preferably having 1 to 12, more preferably 2 to 5, carbon atoms per group. Triethylborane, tripropylborane and tributylborane are presently believed to be especially preferred. Tri-n-butylborane is presently most preferred because it give greater MI increase than the others tested. Other boron compounds such as boron alkoxides, for instance B(C$_2$H$_5$)$_2$OC$_2$H$_5$, alkyl haloboron compounds, for instance BC$_2$H$_5$Cl$_2$, aryl borons such as triphenylborane and metal aryl borate (MBR$_4$) can also be used. The boron compound cocatalyst is generally utilized in an amount so as to give an atom ratio of boron to chromium within the range of 0.5:1 to 15:1, preferably 2:1 to 10:1. This is based on test results indicating that lower amounts are progressively less effective and higher amounts, while operable, do not give any appreciable added benefit. Based on the solvent if any, these amounts of boron compound cocatalyst correspond to a range of 0.5 to 20, preferably 2 to 10 parts by weight per million parts by weight of the solvent, these amounts being based on the total reactor contents in instances where no solvent is utilized.

The boron-containing cocatalyst can either be premixed with the catalyst or added as a separate stream to the polymerization zone, the latter being preferred.

The catalysts of this invention can be further treated in the same manner as chromium on silica catalysts are sometimes given special treatments such as being fluorided or being reduced and reoxidized by, for instance high temperature treatment in CO followed by activation as described herein in an oxidizing ambient.

The catalyst of this invention comprising a chromium compound on a predominantly amorphous aluminum phosphate-containing xerogel base can be used to polymerize at least one mono-1-olefin containing 2 to 8 carbon atoms per molecule. The invention is of particular applicability in producing ethylene homopolymers and copolymers from mixtures of ethylene and one or more comonomers selected from 1-olefins containing 3 to 8 carbon atoms per molecule. Exemplary comonomers for use with ethylene include aliphatic 1-olefins, such as propylene, 1-butene, 1-pentene, 1-hexene, 1-octene and other higher olefins and conjugated or non-conjugated diolefins such as 1,3-butadiene, isoprene, piperylene, 2,3-dimethyl-1,3-butadiene, 1,4-pentadiene, 1,7-hexadiene, and other such diolefins and mixtures thereof. Ethylene copolymers preferably constitute at least about 90, preferably 96 to 99.7 weight percent polymerized ethylene units and 0.3 to 4 weight percent comonomer. Propylene, 1-butene, 1-pentene, 1-hexene, and 1-octene are especially preferred comonomers.

The polymers can be prepared from the catalyst of this invention by solution polymerization, slurry polymerization, and gas phase polymerization techniques using conventional equipment and contacting processes. Contacting of the monomer or monomers with the catalyst can be effected by any manner known in the art of solid catalysts. One convenient method is to suspend the catalyst in an organic medium and to agitate the mixture to maintain the catalyst in suspension throughout the polymerization process. Other known contacting methods such as fluidized bed, gravitating bed, and fixed bed can also be employed.

The catalysts of this invention are particularly suitable for use in slurry polymerization systems to produce a complete spectrum of polymers so far as melt flow is concerned, utilizing a single catalyst. Everything from blow molding grade resins which may require a melt index of as little as 0.1 or less to paper coating and injection molding grade resins which may require a melt flow of 20 or greater can be produced from a single catalyst system simply by the use of a molecular weight control agent, such as hydrogen. While hydrogen is known as a molecular weight control agent, the catalyst of this invention displays an extraordinary sensitivity to hydrogen so that by controlling the amount of hydrogen utilized, polymers having a very high molecular weight as indicated by low melt flow, though polymers having a very low molecular weight as indicated by high melt flow can be obtained. Further control of melt flow can be obtained by the small amount of leeway in temperature control and by the known effect of higher catalyst activation temperature causing the melt flow of the resulting polymer to be higher. However, yet a further advantage of this inventin is that a single activation temperature for the catalyst and a single polymerization temperature can be utilized and still obtain a broad spectrum of polymers utilizing a single catalyst. By "spectrum of polymers", it is meant that catalyst can be used to produce a low flow polymer one time. Then another time, the same type of catalyst can be used to produce a high flow polymer or anything in between by adjusting other variables such as temperature and amount of hydrogen.

With slurry polymerization of ethylene and predominantly ethylene copolymer systems, the conventional temperature range is generally about 200°-230° F. (93°-110° C.) and the commercial systems are generally run as close to the maximum (i.e., the point polymer goes into solution) as possible, i.e. 225° F.±5° F. (107° C.±3° C.) in order to get the highest possible melt index. The catalyst of this invention allows running at the low end of the conventional temperature range, i.e. (205° F. ±5° F. (96° C.±3° C.) in systems normallyemploying 225° F. (107° C.). The lower temperature gives a relatively higher monomer partial pressure, thus giving higher activity.

Catalysts of this invention have the further advantage of not having any noticeable induction time between initial contact with the monomer and the initiation of polymerization.

When hydrogen is used in the prior art, it is generally used at partial pressures up to 120 psia (0.8 MPa), preferably within the range of 20 to 70 psia (0.01 to 0.48 MPa). Similar amounts are used in accordance with this invention, although because of the high sensitivity to hydrogen, it is possible to use smaller amounts, for instance 10 to 70 psia.

The tendency of the catalysts of this invention to produce higher melt flow polymers when hydrogen is utilized corresponds to the tendency of other catalyst systems to produce higher melt flow polymers when hydrogen is utilized, the difference being that the catalyst of this invention is extraordinarily sensitive to the effects of hydrogen. However, in other areas, the catalysts of this invention act in a manner different from the prior art catalysts and these differences are in a beneficial direction. For instance, boron cocatalysts sometimes used in the prior art are used in spite of the fact that they tend to have an adverse effect on melt flow, i.e., cause the melt flow to drop. However, the boron cocatalysts of this invention substantially increase the melt flow, while boron in the phosphate support of this invention lowers melt flow, thus giving a unique opportunity to control melt flow and related polymerization conditions.

Further, there are known relationships between the density of a polymer of a particular monomer and the resulting properties such as stress crack resistance and flexural modulus. The polymers of the prior art generally represent a compromise between competing properties, for instance, in the use of a small amount of comonomer in ethylene polymers to produce a polymer with greater stress crack resistance but one which has a concomitant decrease in flexural modulus. Unaccountably, the polymers produced by the catalysts of this invention have densities (and the corresponding higher flexural moduli associated therewith) in excess of what would be predicted for a given monomer and at the same time exhibit a whole order of magnitude greater stress cracking resistance than would be expected based on the performance of similar prior art olefin polymers. This increase in density also is the inverse of what occurs in prior art catalyst systems using boron cocatalysts since boron cocatalysts normally decrease density. These novel and beneficial properties are all the more remarkable because infrared analysis of the polymer does not indicate any difference between the novel polymers of this invention and conventionally produced olefin polymers.

It is known in the art that the presence of a comonomer in ethylene polymerization may increase the melt flow of the resulting polymer. However, with the catalyst of this invention this effect is unexpectedly magnified, with only small amounts of comonomer giving major increases in melt flow of the resulting polymer. The difference is one of a kind rather than degree such that it is actually feasible to use comonomer addition as a method of controlling melt flow.

This is particularly feasible because of the other peculiar characteristic of the cocatalysts of this invention to give high density polymer. Thus even with some comonomer to raise melt flow, the density and flexural modulus are still high. Suitable amounts of comonomer for this purpose can vary widely particularly if the object is to produce a copolymer. If the object is to produce a polymer which is essentially a homopolymer, 0.001 to 0.3, preferably 0.01 to 0.1 mole percent comonomer based on the moles of ethylene in the feed can be used. If the object is to produce a copolymer, 0.5 to 20 mole percent or more can be used although enough to give 0.4 to 3 weight percent incorporation based on the weight of all monomers is preferred. Preferred comonomers for predominantly ethylene homopolymers are at least one of propylene, 1-butene, 1-pentene, 1-hexene and 1-octene. Polymers having a melt index of greater than 0.1 can easily be produced in this way in a slurry system.

Figure 4:
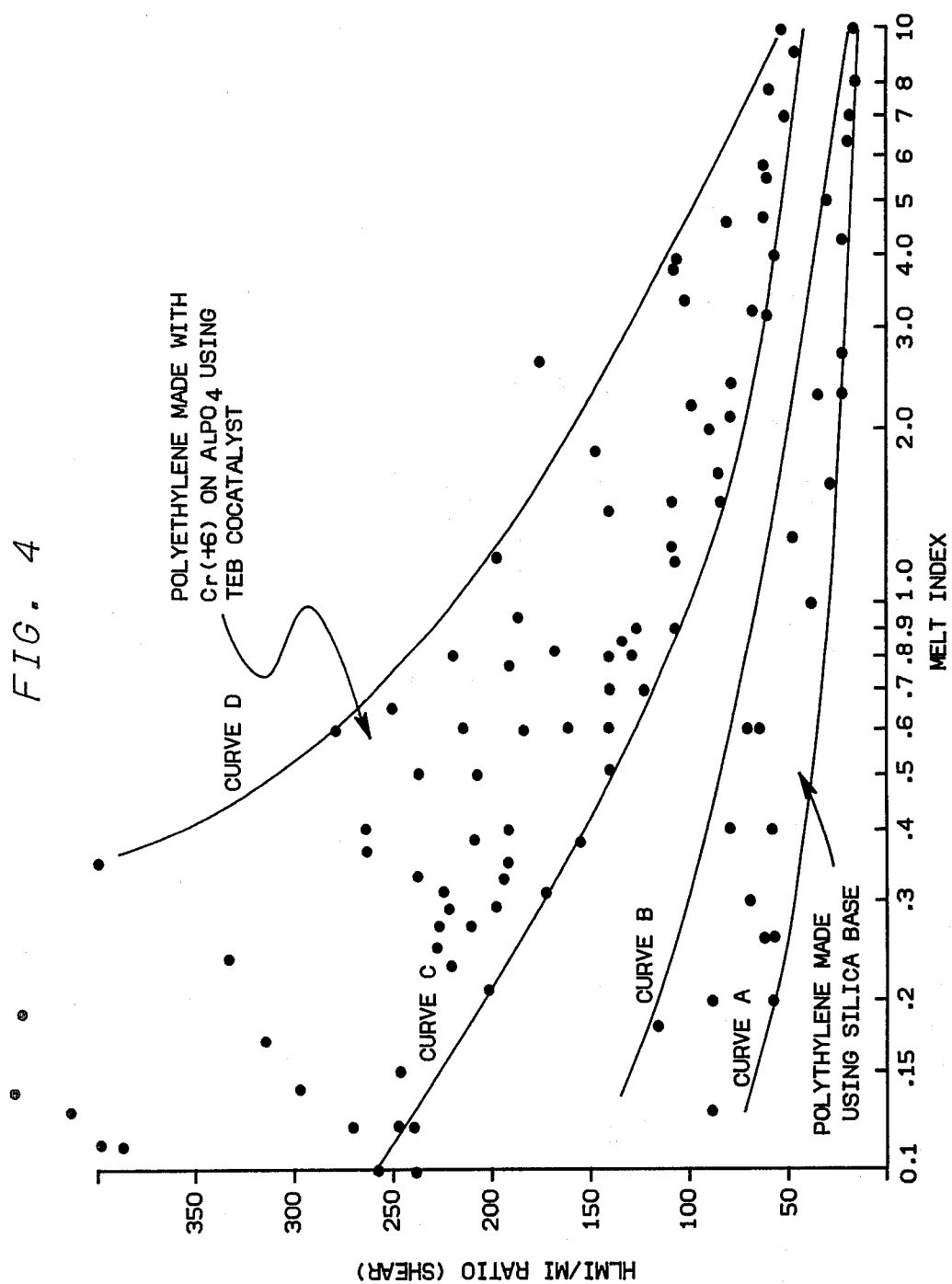
FIg. 4 is a plot of melt index versus shear response.
Figure 5:
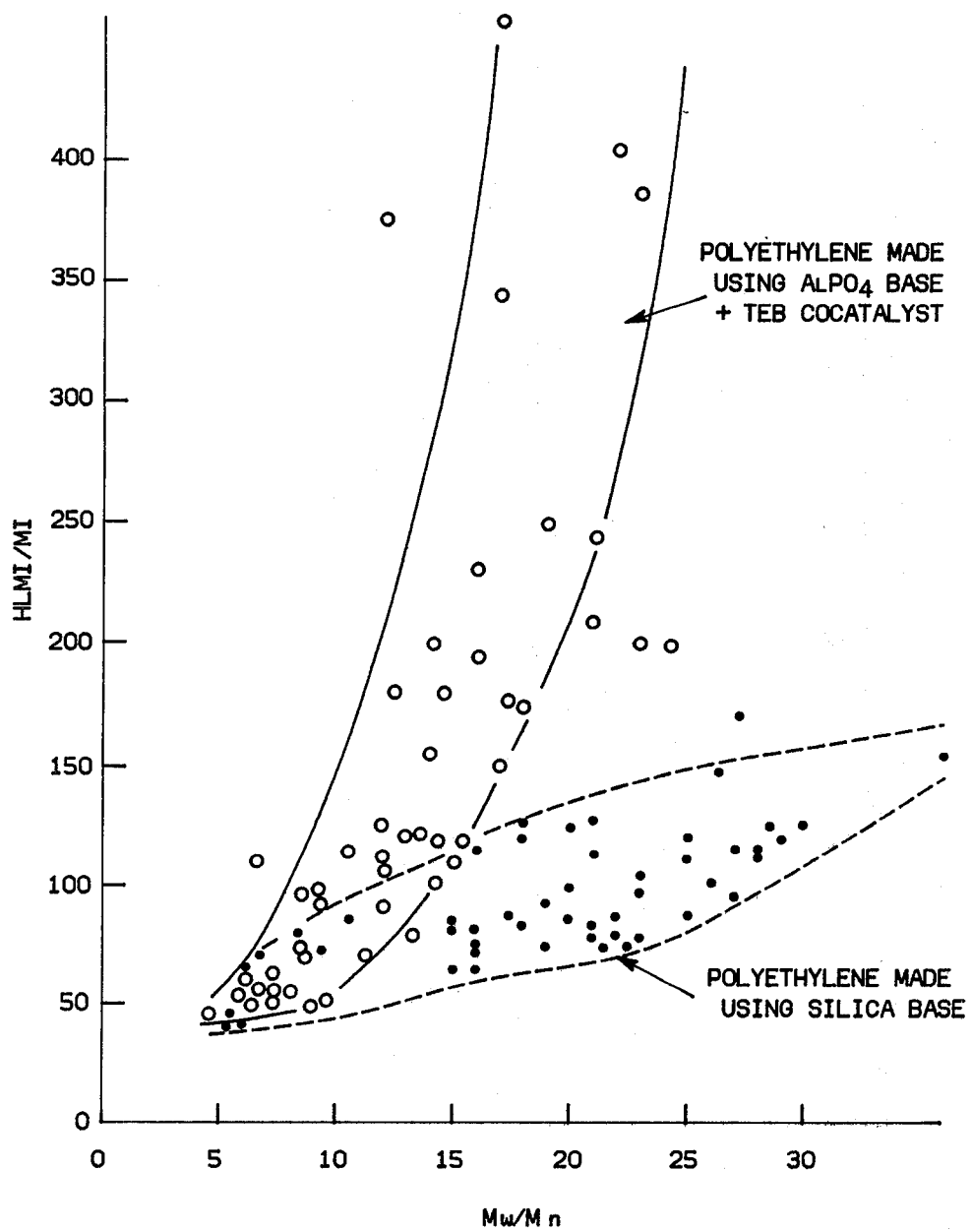
FIG. 5 is a plot of molecular weight distribution versus shear response.

Another area in which the prior art olefin polymers always represent a compromise in properties is with regard to shear response. For certain applications, a high shear response as evidenced by the ratio of high load melt index to melt index, is desirable. This has heretofore been associated with broad molecular weight distribution as determined by size exclusion chromatography, for instance. Unexpectedly the polymers produced by the catalysts of this invention exhibit high shear response as evidenced by high HLMI/MI ratios indicating extremely broad molecular weight distribution. However, the size exclusion chromatography analyses indicate a far narrower $M_w/M_n$ than would be expected for a given HLMI/MI ratio. The molecular weight distribution or heterogeneity index is indicated by the ratio of the weight average molecular weight ($M_w$) to the number average ($M_n$). In this regard, it must be kept in mind that HLMI/MI ratios are meaningful only if compared on a comparable melt index basis. The references herein to melt index (MI) refer to ASTM D1238-65T, Condition E, and to high load melt index (HLMI) refer to ASTM D1238-65T, Condition F, the difference being 21,600 gram weight in the high load test and a 2,160 gram weight in the regular melt index test, the temperature being 190° C. in each instance when the tests are utilized for predominantly ethylene polymers and copolymers. FIGS. 4 and 5 visually depict this novel property.

The following table demonstrates the relationship between melt index, HLMI/MI ratio, and $M_w/M_n$ as determined by size exclusion chromatography for a number of actual runs made in accordance with the invention. For comparison, a polymer produced by prior art silica supported chromium oxide catalysts having a melt index of 0.1 to 0.5 has an HLMI/MI ratio of about 100 and a $M_w/M_n$ of about 12 for a HLMI/MI to $M_w/M_n$ ratio of about 8 which contrasts with the ratio of 17–31 for the polymers of the invention in the melt index range between 0.1 and 0.5. Thus within this MI range novel polymers having a ratio of greater than 15 are common using the catalyst system of this invention.

TABLE A

| | MW DISTRIBUTION | | |
|---|---|---|---|
| HLMI | HLMI/MI | Mw/Mn | Ratio of HLMI/MI to Mw/Mn |
| 30.1 | 43 | 4.6 | 9.3 |
| 19.8 | 39 | 5.5 | 7.1 |
| 17.8 | 47 | 7.5 | 6.3 |
| 12.0 | 51 | 6.3 | 8.1 |
| 3.8 | 115 | 11.0 | 10.5 |
| 1.5 | 118 | 15.3 | 7.7 |
| 0.63 | 246 | 20.9 | 11.8 |
| 0.60 | 210 | 20.9 | 10.0 |
| 0.43 | 375 | 12.1 | 31.0 |
| 0.23 | 461 | 17.0 | 27.0 |
| 0.13 | 386 | 23.0 | 17.0 |
| 0.12 | 346 | 16.7 | 21.0 |
| 0.14 | 405 | 22.2 | 18.0 |
| 0.17 | 641 | 25.0 | 26.0 |

Table B demonstrates the relationship between density and P/Al atom ratio for ethylene homopolymerization using a chromium catalyst on an aluminum phosphate base activated at 500° C. The density was determined by the standard density gradient column method (ASTM D 1505-68). TEB stands for triethlyborane.

TABLE B

| DENSITY AND P/Al ATOM RATIO | | |
|---|---|---|
| | Melt Flow | Density |
| P/Al = 0.8 | | |
| Alone | 0 HLMI | 0.9622 |
| H₂ | 0.31 MI | 0.9651 |
| TEB | 0.43 MI | 0.9716 |
| TEB + H₂ | 16.2 MI | 0.9722 |
| P/Al = 0.2 | | |
| Alone | 0.1 HLMI | 0.9543 |
| TEB | 0.1 HLMI | 0.9579 |
| TEB + H₂ | 0.4 MI | 0.9626 |

As can be seen densities in excess of 0.965 for unannealed polymer are possible with the catalyst of this invention. While the art sometimes broadly alludes to polyethylene densities above 0.965 and such can be obtained by annealing, the fact is that the densities produced with the catalyst of this invention for a given set of conditions are higher than can be produced with prior art chromium or titanium catalyst systems.

Table C demonstrates the relationship of density and ESCR for ethylene homopolymers produced using catalysts of this invention.

TABLE C

| ESCR AND FLEXURAL MODULUS | | | | | | | |
|---|---|---|---|---|---|---|---|
| | | | | | | Flexural Modulus[3] | |
| P/Al | Temp. | Add. | MI | Den.[1] | ESCR[2] | MPa | psi |
| 0.2 | 500° C. | H₂ + | 0.10 | 0.9626 | 428 | 1458 | 211,500 |

TABLE C-continued
ESCR AND FLEXURAL MODULUS

| P/Al | Temp. | Add. | MI | Den.[1] | ESCR[2] | Flexural Modulus[3] MPa | psi |
|------|-------|------|------|--------|---------|------|---------|
| 0.4 | 300° C. | TEB H$_2$ | 0.11 | 0.9636 | 214 | 1497 | 217,100 |
| 0.4 | 300° C. | H$_2$ + TEB | 0.37 | 0.9666 | 82 | 1604 | 232,600 |
| 0 8 | 300° C. | TEB | 0.60 | 0.9701 | 181 | 1519 | 220,300 |
| 0.8 | 500° C. | H$_2$ | 0.23 | 0.9629 | 47 | 1656 | 240,200 |
| 1.0 | 500° C. | H$_2$ | 0.30 | 0.9651 | 47 | 1657 | 240,300 |
| 1.0 | 500° C. | TEB | 0.43 | 0.9710 | — | 1869 | 271,100 |
| 1.0 | 700° C. | TEB | 2.5 | 0.9727 | — | 2020 | 293,000 |

[1] ASTM D 1505-68.
[2] ASTM D 1693-70, Condition A (50° C.), Environmental Stress Crack Resistance.
[3] Flexural Modulus ASTM D 790-66.

Figure 3:
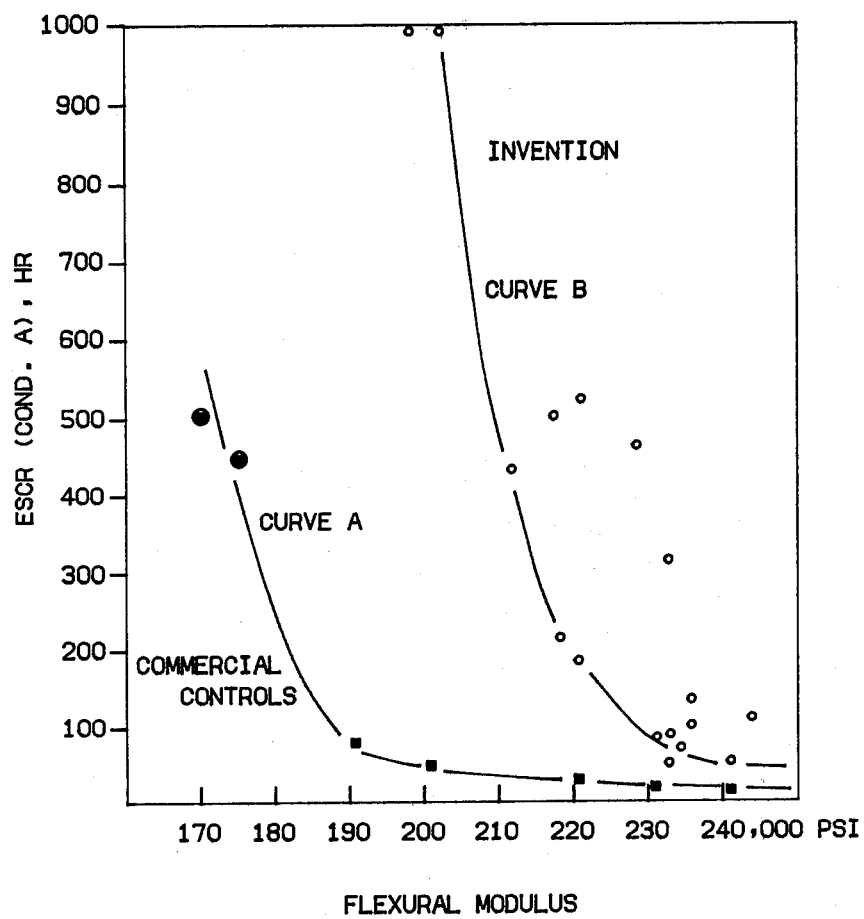
FIG. 3 is a plot of stress crack resistance versus flexural modulus for polymers of the invention and for prior art polymers.

Ethylene homopolymers of the prior art normally have an environmental stress crack resistance at a nominal 0.1 MI of less than 30 hours. As can be seen, the invention polymers have an ESCR as much as an order of magnitude higher than would be expected and with higher, not lower stiffness. It is known in the prior art to feed pure ethylene to a reactor using a catalyst which oligomerizes some of the ethylene to 1-butene or other comonomers and thus get a polymer of good ESCR but such polymer has the low density and poor (low) flexural modulus normally associated with copolymers. This novel property of the polymers of this invention is visually depicted in FIG. 3 which shows the relationship between environmental stress crack resistance (ESCR) and modulus for commercial high density olefin polymers and the novel type of polymers produced by the catalyst of this invention. In all instances, the melt index is in the 0.1 to 0.9 range so the comparison is on a fair basis.

EXAMPLE I

Catalyst Preparation

The catalysts were prepared in three general methods and variations thereof.

In method A (the first method broadly described hereinabove), about 0.5 mole of Al(NO$_3$)$_3$.9H$_2$O was dissolved in about 500 mL of deionized water and to it was added sufficient 85% H$_3$PO$_4$ to give the desired atomic ratio of P:Al. The resulting solution was neutralized by adding sufficient concentrated ammonium hydroxide to reach a pH of about 6–7. The white hydrogel precipitate was filtered off and washed with about 3L of deionized water. The filter cake was dried in procedure (1) by simply placing it in a vacuum oven at about 80° C. for a few hours. In a preferred procedure (2) the filter cake was dried of water by employing azeotropic distillation or washing with isoamyl alcohol to remove the water. Each product after removal of water was impregnated with a solution of chromium (III) acetate dissolved in an alkanol, such as methyl alcohol, sufficient to provide about 1 weight percent chromium based on the dry finished catalyst. Afterward the filter cake was dried of alcohol by heating at 60° C. in a vacuum to remove the alcohol. Each catalyst was activated for polymerization by calcining it in a fluidized bed with dry air for about 5 hours or more at the specified temperature.

When a boron-aluminum phosphate gel is desired a suitable amount of a soluble borate such as ammonium borate or boric acid can be included with the aluminum salt. It is convenient to employ a commercially available compound combining both aluminum and boron such as Al(OH)$_2$OC$_2$H$_5$.1/3H$_3$BO$_3$ in place of the aluminum nitrate.

Also, in place of or in admixture with the H$_3$PO$_4$, ammonium phosphates such as NH$_4$H$_2$PO$_4$ and (NH$_4$)$_2$HPO$_4$ can be used alone or mixtures thereof to furnish the desired amount of phosphate ions required to make the metal phosphate gels.

Another soluble aluminum salt such as aluminum acetate or sulfate can be substituted for the nitrate, if desired. Less preferable soluble aluminum salts such as the chloride can also be employed but the gels may require more thorough washing to remove most of the chloride anions.

Method B (the second method broadly described hereinabove) is a substantially anhydrous method. To a solution containing about ⅓ mole of aluminum triisopropoxide (or related alkoxide) dissolved in about 400 mL of dry isopropyl alcohol, for example, was added a solution containing about 200 mL of dry isopropyl alcohol, a little deionized water, e.g. 0.2 mole, and sufficient 85% H$_3$PO$_4$ to give the desired atomic ratio of P:Al. For example, with about 6.5 mL of 85% H$_3$PO$_4$ (0.095 mole), the P:Al atomic ratio is about 0.76:1. The resulting precipitate was isolated by filtering and the filter cake is dried in a vacuum oven at about 80° C. The dry product was then impregnated anhydrously by contact with a methanol solution of chromium(III) acetate sufficient to provide about 1 weight percent chromium based on the dry, finished catalyst. The catalyst was activated by heating for the desired length of time, e.g. five hours, at the specified temperature in a fluidized bed in dry air. Method B is different in principle from methods A and C in that the gel forms on addition of the phosphoric acid.

Method C (the third method broadly described hereinabove) is presently preferred. It was generally carried out by heating the desired quantity of an aluminum salt such as Al(NO$_3$)$_3$.9H$_2$O, e.g., about 1 lb. (454 g), to about 80° C. to form a melt. The desired quantity of an ammonium phosphate, e.g., NH$_4$H$_2$PO$_4$, was dissolved in the melt to provide the atomic ratio of P/Al needed, and finally the desired amount of chromium(III) acetate or chromium (III) nitrate was added to the melt mixture to provide about 1 weight percent chromium based on the weight of the dry, finished catalyst. Sufficient concentrated NH$_4$OH, e.g., 30 weight percent NH$_3$, was mixed with the melt mixture to neutralize it giving a pH of about 6–7. The resulting mixture was washed with sufficient deionized water to remove substantially all of the ammonium nitrate by-product and the washed product in turn was washed with isopropyl alcohol or other volatile water-miscible organic liquid to displace the water or azeotrope dried. The resulting product can be further dried in a vacuum oven, if desired, and activated as before in a fluidized bed in dry air for about 5 hours at the specified temperature. As with the first method (Method A), boric acid or a soluble borate such as ammonium borate can be included with the reactants prior to gellation.

In the catalyst preparation of Method C, the melt containing the Al(NO$_3$)$_3$.9H$_2$O, the NH$_4$H$_2$PO$_4$ and the Cr(NO$_3$)$_3$.9H$_2$O can be treated with NH$_4$OH to obtain a pH of about 6–7 to form the gel and the gel dried in the presence of the by-product NH$_4$NO$_3$. While this is essentially a nonaqueous system, there is a small amount of water present such that a sheet of pH indicator paper can be pressed into the gel and a pH reading obtained.

The dry product can then be cautiously calcined to obtain the final catalyst. This procedure must be done carefully to avoid potential explosions or other undesired reactions.

Method C is fundamentally different from Methods A and B in that no solvent is used.

EXAMPLE II

Ethylene Polymerization

Each run was conducted in a clean, dry, air-free, stirred, stainless steel reactor of about a 2 L capacity. About 600 g of isobutane was used in each run as diluent with a catalyst charge ranging from about 0.03 to about 0.8 g. The reactor and its contents were heated to the desired operating temperature, ethylene was pressured in to give about 565 psia (3.9 MPa), and the run was started immediately as the catalysts, unlike the corresponding chromium oxide-silica catalysts, do not have an induction period. Ethylene pressure was maintained during the run by supplying additional ethylene as required from a reservoir. When used, the triethylborane (TEB) was added to the reactor as a solution of 1 weight percent in n-heptane.

Each run was terminated by stopping the ethylene flow and venting the gaseous reactor contents to a flare line for disposal. The polymer was recovered, dried and weighed to determined catalyst productivity which is expressed in terms of grams polyethylene per gram catalyst.

The physical properties of each polymer, in this and subsequent examples, when given, were determined in accordance with the following ASTM test procedures.
Melt index (MI): ASTM D 1238-65T, Condition E.
High load melt index (HLMI): ASTM D 1238-65T, Condition F.
Density, g/cc: ASTM D 1505-68.

The HLMI/MI ratio is thought to give an indication of the polymer molecular weight distribution or shear response. As the ratio increases, the molecular weight distribution is also thought to increase.

The heterogeneity index (HI) is thought to provide a more accurate representation of polymer molecular weight distribution. As the ratio increases, the molecular weight distribution is thought to broaden. HI is determined from the weight average and number average molecular weight values obtained from size exclusion chromatography.

Ethylene polymerization was carried out with samples of the catalysts activated at different temperatures and the results are summarized in Table I.

TABLE I

Effect of Alkyl Boron Cocatalyst

| Run No. | Prep. | P/Al | Act. Temp. °C. | Add. | Run Temp. °F. | Prod. g/g | Time min. | MI | HLMI/MI |
|---|---|---|---|---|---|---|---|---|---|
| 1 | Aq-Az[1] | 1.0 | 500 | None | 205 | 1725 | 90 | 0 (.74 H)[6] | — |
| 2 | | | | 8 ppm TEB | (96° C.) | 3565 | 65 | .43 | 375 |
| 3 | | | | H$_2$ | | 1400 | 90 | .30 | 152 |
| 4 | | | | 8 ppm TEB + H$_2$ | | 2515 | 50 | 11.4 | 57 |
| 5 | Aq-OD[2] | 0.9 | 700 | None | 225 | 605 | 90 | 0 (.86 H) | — |
| 6 | | | | 8 ppm TEB | (107° C.) | 509 | 60 | 1.2 | 144 |
| 7 | | | | H$_2$ | | 427 | 100 | 0.95 | 104 |
| 8 | | | | 8 ppm TEB + H$_2$ | | 605 | 90 | 32 | 47 |
| 9 | Melt-Az[3] | .8 | 700 | None | 205 | 3844 | 60 | 0 (.76 H) | — |
| 10 | | | | 4 ppm TEB | (96° C.) | 9420 | 60 | 1.41 | 122 |
| 11 | | | | 4 ppm TEB + H$_2$ | | 5340 | 60 | 6.8 | 64 |
| 12 | Melt-Az[3] | .8 | 500 | None | 205 | 3135 | 60 | 0 (.37 H) | — |
| 13 | | | | 4 ppm TEB | (96° C.) | 5440 | 60 | .51 | 143 |
| 14 | | | | 4 ppm TEB + H$_2$ | | 5605 | 60 | 3.15 | 73 |
| 15 | Melt-OD[4] | .8 | 600 | 4 ppm TEB | 205 (96° C.) | 3010 | 90 | .03 | 533 |
| 16 | Melt-Az[5] | .8 | 600 | 4 ppm TEB | 205 (96° C.) | 2230 | 60 | .04 | 511 |

[1]Method A with drying method (2), i.e. aqueous precipitation and azeotrope drying.
[2]Method A with drying method (1), i.e. aqueous precipitation and oven drying.
[3]Method C, i.e. hydrogel formed from melt but then water added to wash followed by azeotropic drying.
[4]Hydrogel formed from melt but water added to wash followed by oven drying, i.e. also a concentrated mass during gellation. In this run, 469 grams (1.25 mole) of Al(NO$_3$)$_3$·9H$_2$O and 3.48 grams boric acid were used with sufficient monobasic ammonium phosphate to give the Al/P ratio of 0.8. Some water (125 mL) was in the melt and the melt was dripped into concentrated ammonium hydroxide.
[5]Like (4) except washed in alcohol and the alcohol removed in a vacuum oven. While the productivity is not outstanding in this run, other runs gave better overall results. One other run similar to this except without boric acid and using aluminum sulfate instead of aluminum nitrate gave 32 cc grams polymer per gram of catalyst in 25 minutes.
[6]"H" indicates HLMI.

In the first series, Runs 1 and 3 are control runs. A comparison of 1 and 2 shows the dual benefit in productivity and melt flow from the triethylborane (TEB) cocatalyst. A comparison of Runs 2, 3 and 4 shows how much more effective in increasing melt flow hydrogen is with a catalyst of this invention as compared with a prior art catalyst.

Runs 5–8 show the same effect of the boron-containing cocatalyst at a different P/Al ratio, different activation temperature, and different polymerization temperature, Runs 5 and 7 being control runs.

Run 9 is a comparative control run for the third series relative to Runs 10 and 11 to show the same effect of the boroncontaining cocatalyst in a catalyst produced by Method C. Run 9 on an absolute basis is an invention run since it shows the phosphate base produced from a melt gives high productivity, i.e. 3844 versus 1725 in Run 1. While part of this difference may be due to changes in other variables, the advantage for the melt gellation has been shown by other runs.

In the fourth series, Runs 13–14 show the same effect of the boron-containing cocatalyst at a different catalyst activation temperature as compared with comparative Control Run 12.

Invention Runs 15–16 show improved productivity compared with Control Run 1. Also while the melt index is slightly higher (a barely measurable amount using the regular melt index test compared with 0), these runs show that compared with Runs 10, 11, 13 and 14, the melt index is lower. This would allow higher activation temperature (to get higher activity) if desired.

EXAMPLE III

A series of polymerization runs was made in the reactor at 96° C. for 1 hour in the manner described before using a catalyst prepared as described in Method B and a metal alkyl adjuvant. The P:Al atomic ratio was 0.8:1 and each catalyst was activated at 500° C. for 5 hours in dry air under fluidizing conditions.

The concentration of metal alkyl is expressed in ppm based on the weight of diluent contained in the reactor.

Hydrogen, when used, was generally introduced to the reactor containing the desired ethylene pressure to provide 50 psi (0.34 MPa) partial pressure. The total pressure in each run was about 565 psia.

The results obtained are given in Table II.

TABLE II
Effect Of Metal Alkyl Adjuvant,
Catalyst On Polymer Melt Index

| Run No. | Metal Alkyl(a) Concentration ppm | Type | MI | HLMI/MI | Productivity g/g cat/hr | Remarks |
|---|---|---|---|---|---|---|
| 17 | 0 | None | 0 (0.2 H) | (b) | 1725 | Control |
| 18 | 8 | BEtCl$_2$ | 0.10 | 250 | 505 | |
| 19 | 8 | BEt$_2$OEt | 0.69 | 144 | 1200 | |
| 20 | 8 | DEAC | 0 (0.6 H) | — | 1450 | |
| 21 | 4 | DEAC | 0.10 | 204 | 1190 | H$_2$ also used |
| 22 | 8 | DEALE | 0 (0.5 H) | — | 1160 | |
| 23 | 8 | DEZ | 0.10 | 156 | 1245 | H$_2$ also used |
| 24 | 8 | EADC | 0 (0.6 H) | — | 1065 | |
| 25 | 8 | EADC | 0.03 | 526 | 1100 | H$_2$ also used |
| 26 | 8 | LiBu | 0.01 | 606 | 1240 | |
| 27 | 2 | LiBu | 0.09 | 211 | 980 | H$_2$ also used |
| 28 | 8 | MgBu$_2$ | 0.13 | 185 | 1170 | H$_2$ also used |
| 29 | 4 | TEA | 0 (0.2 H) | — | 1885 | |
| 30 | 8 | TEA | 0 (1.4 H) | — | 1720 | |
| 31 | 8 | TEA | 0.23 | 167 | 1055 | H$_2$ also used |
| 32 | 4 | TEB | 0.11 | 375 | 3820 | |
| 33 | 8 | TEB | 0.76 | 190 | 2135 | |
| 34 | 16 | TEB | 0.61 | 270 | 1930 | |
| 35 | 4 | TEB | 5.5 | 75 | 3225 | H$_2$ also used |

(a)Abbreviations used
BEtCl$_2$ ethyldichloroborane
BEt$_2$OEt diethylboron ethoxide
DEAC diethylaluminum chloride
DEALE diethylaluminum ethoxide
DEZ diethylzinc
EADC ethylaluminum dichloride
LiBu n-butyllithium
MgBu$_2$ di-n-butylmagnesium
TEA triethylaluminum
TEB triethylborane
(b)A dash signifies not applicable.
H under MI heading is HLMI.

Inspection of the data given in Table II reveals that of the metal alkyls tested, only the boron compounds cooperate with the catalyst in yielding polymers having substantially higher melt index values than that of comparative control run 17. A comparison of runs 32 (no H$_2$) and 35 (H$_2$) shows that when hydrogen and triethylborane are both present the combination gives unexpectedly high melt index response and good productivity, e.g., with 4 ppm TEB, the polymer melt index is 0.11 and productivity is 3820 g polymer per g catalyst and with 4 ppm TEB plus hydrogen, the polymer melt index is 5.5 and productivity is 3225 g polymer per g catalyst. Other non-boron-containing cocatalysts which were tried and found not to produce any MI improvement over that of Control Run 17 were tributyl antimony, triphenyl antimony, tetrabutyl tin, and tributyl tin (Sn$_2$Bu$_6$).

These data show: (1) a variety of boron-containing cocatalysts gave higher melt index, and (2) none of the non-boron-containing cocatalysts tried gave significantly higher melt index. The trialkylborane-containing cocatalysts worked best giving both higher melt index and greater productivity. One boron-containing cocatalyst was tried which had little or no beneficial effect. This was sodium tetraphenylborate. Two others, lithium tetrabutylborate and triphenylborane had only a slight beneficial effect.

EXAMPLE IV

Another series of catalysts having a calculated atomic ratio of P/Al of about 1, some prepared in the presence of a borate, were made by employing catalyst preparation Method A. The catalysts containing AlPO$_4$ alone were made by precipitating an aqueous solution containing aluminum nitrate and diammonium hydrogen phosphate with aqueous ammonium hydroxide to a final pH of about 6-7. Yhe precipitate was washed with hot water, oven dried (conventional preparation method) and impregnated with an aqueous solution of CrO$_3$ sufficient to provide 1 weight percent chromium on the finished catalyst.

The catalysts made with aluminum and boron prepared by contacting an aqueous solution containing 140 g of Al(OH)$_2$OC$_2$H$_5$.1/3H$_3$BO$_3$ with a water solution containing 132 g of (NH$_4$)$_2$HPO$_4$ to obtain a stiff, white precipitate. The precipitate was filtered, the cake washed with water and then dried by azeotropic distillation with isoamyl alcohol. This drying was done under mild conditions, i.e. at room temperature up to the boiling point of the azeotrope. With isoamyl alcohol which boils at 136° C., the azeotrope boils at about 95° C. so the drying takes place mainly at 95° C. but creeps up to 135° C. at the end. With isopropyl alcohol the mixture is just warmed slightly, i.e. up to about 60° C. The product was dried at 150° C. in nitrogen and then impregnated with a solution containing chromium (III) acetate dissolved in methyl alcohol sufficient to provide 1 weight percent chromium based on the final catalyst.

Individual portions of the catalyst samples were then activated at the indicated temperatures and times.

Analysis of the finished catalysts showed the actual P/Al atomic ratios to be about 0.95:1.

The catalysts were employed in ethylene polymerization as before. In some runs, 50 psi hydrogen was present, in some runs 4 ppm TEB was present and in some runs both 50 psi hydrogen and 4 ppm TEB were present. All of the AlPO$_4$ bases were oven dried and the polymerization carried out at 225° F. All of the AlPO$_4$-BPO$_4$ bases were azeotrope dried and the polymerizations carried out at 205° F.

The results are presented in Table III, runs 36-47.

An AlPO$_4$-BPO$_4$ base was prepared utilizing 469 grams of Al(NO$_3$)$_3$.9H$_2$O plus 3.9 grams of boric acid, 11.5 grams Cr(NO$_3$)$_3$.9H$_2$O, 115 grams monobasic ammonium phosphate and 125 mL of water. One part of this melt was diluted with one-half part of water and the resulting concentrated mass dripped into concentrated ammonium hydroxide. The resulting gel was washed twice with water and then with alcohol. This is et out in Table III hereinbelow as run A. Run B hereinbelow is identical except the dilution was 1:1. The above procedure was repeated except titanyl sulfate was substituted for the boric acid so as to give 5 mole percent titanium instead of 5 mole percent boron and a small amount of hydrogen peroxide was utilized in order to dissolve the titanyl sulfate. This is set out hereinbelow as run C. Run D set out hereinbelow is identical to run C except 7.5 mole percent titanium was used in place of the 5 mole percent boron.

TABLE III

Ethylene Polymerization, AlPO$_4$—BPO$_4$ Support

| Run No. | Gel Base | Catalyst Activation Temp. °C. | Time Hours | Run Time, Min. | MI | HLMI | HLMI MI | Productivity g/g cat/hr | Remarks | Adjuvant System |
|---|---|---|---|---|---|---|---|---|---|---|
| 36 | AlPO$_4$ | 500 | 16 | 90 | 0 | 2.0 | — | 382 | Control | None |
| 37 | AlPO$_4$—BPO$_4$ | 500 | 5 | 90 | 0 | 0.96 | — | 1960 | Invention | None |
| 38 | AlPO$_4$ | 400 | 16 | 73 | 0 | 16 | — | 205 | Control | None |
| 39 | AlPO$_4$—BPO$_4$ | 300 | 5 | 81 | 0 | 3.9 | — | 796 | Invention | None |
| 40 | AlPO$_4$—BPO$_4$ | 300 | 5 | 90 | 0.65 | 80 | 123 | 1150 | Invention | TEB |
| 41 | AlPO$_4$—BPO$_4$ | 500 | 5 | 50 | 12 | 756 | 63 | 2195 | Invention | H$_2$ + TEB |
| 42 | AlPO$_4$ | 700 | 15 | 90 | 0 | 0.86 | — | 605 | Control | None |
| 43 | AlPO$_4$—BPO$_4$ | 700 | 5 | 90 | 0 | 0.58 | — | 2500 | Invention | None |
| 44 | AlPO$_4$ | 700 | 15 | 60 | 1.2 | 173 | 144 | 509 | Invention | TEB |
| 45 | AlPO$_4$—BPO$_4$ | 700 | 5 | 60 | 2.5 | 230 | 92 | 2820 | Invention | TEB |
| 46 | AlPO$_4$ | 700 | 15 | 90 | 32 | 1504 | 47 | 605 | Invention | H$_2$ + TEB |
| 47 | AlPO$_4$—BPO$_4$ | 700 | 5 | 40 | 16 | 768 | 48 | 1945 | Invention | H$_2$ + TEB |
| A | AlPO$_4$—BPO$_4$ | 600 | 3–5 | 60 | 0 | 11.4 | — | 2475 | Ivention | 4 ppm TEB |
| B | AlPO$_4$—BPO$_4$ | 600 | 3–5 | 40 | .02 | 10.0 | 498 | 4898 | Invention | 4 ppm TEB |
| C | AlPO$_4$—Ti | 600 | 3–5 | 60 | 0.19 | 47.7 | 251 | 2970 | Control | 4 ppm TEB |
| D | AlPO$_4$—Ti | 600 | 3–5 | 60 | 0.08 | 24 | 300 | 1910 | Control | 4 ppm TEB |

The results show that when the factors which affect productivity are constant there is often an increase in productivity due to the presence of the boron. These data show a decrease in melt index which allows operating at a higher polymerization temperature. In addition the presence of the boron in the support consistently allows control of the MI downward which is sometimes desired because of the inherent ability of the catalysts of this invention to increase MI. The beneficial effects of TEB alone or in conjunction with hydrogen are evident with catalysts derived from AlPO$_4$-BPO$_4$ gels as well as the AlPO$_4$ gels. Based on productivity alone, runs 44 and 46 are no better than the controls. However, the melt index response shows that the presence of TEB alone or with TEB+hydrogen gives an unexpected result even with conventional aluminum phosphate base preparation, hence these are invention runs.

EXAMPLE V

A series of gels in which the atomic ratio of P/Al was varied from 0 to 1.2 was prepared by employing Method A and procedure (2) azeotrope drying, for drying the gels. As before, each gel was impregnated with a solution of chromium (III) acetate dissolved in methyl alcohol sufficient to provide about 1 weight percent chromium based on the dry finished catalyst. As before, each catalyst was activated for polymerization by calcination in a fluidized bed with dry air for about 5 hours at the specified temperature.

Each catalyst was tested for ethylene polymerization as before at 96° C. with 4 ppm TEB in one series and with 4 ppm TEB plus 50 psia (0.34 MPa) hydrogen in a second series.

The melt flows of the produced polymers are given in Table IV.

TABLE IV

Melt Index Response vs. Catalyst Calcining Temperature With TEB and TEB Plus Hydrogen

| Run No. | Base Atom Ratio, P/Al | TEB Catalyst Calcining Temp. °C. | | | Run No. | TEB + Hydrogen Catalyst Calcining Temp. °C. | | |
|---|---|---|---|---|---|---|---|---|
| | | 300 | 500 | 700 | | 300 | 500 | 700 |
| 52 | 0 | dead | 0 | 0 | 59 | dead | dead | 0.05 |
| 53 | 0.2 | 0 | 0 (0.1 HLMI) | 0.3 | 60 | 0 (12 HLMI) | 0.1 | 0.4 |
| 54 | 0.4 | 0 (3 HLMI) | 0 (5 HLMI) | 0.1 | 61 | 0.4 | 1.2 | 3.8 |
| 55 | 0.6 | 0 (8 HLMI) | 0.14 | 0.6 | 62 | 1.5 | 3.4 | 11.5 |
| 56 | 0.8 | 0.6 | 1.2 | 0.5 | 63 | 4.6 | 16 | 18.6 |

TABLE IV-continued

Melt Index Response vs. Catalyst Calcining Temperature With TEB and TEB Plus Hydrogen

| Run No. | Base Atom Ratio, P/Al | TEB Catalyst Calcining Temp. °C. 300 | 500 | 700 | Run No. | TEB + Hydrogen Catalyst Calcining Temp. °C. 300 | 500 | 700 |
|---|---|---|---|---|---|---|---|---|
| 57 | 1.0 | 0.5 | 0.4 | 0.6 | 64 | 10.6 | 11.4 | 17.8 |
| 58 | 1.2 | dead | dead | 0.4 | 65 | dead | dead | dead |

The data presented in Table IV show several trends. Catalysts in which the P/Al atom ratio is zero showed poor activity. Similarly, catalysts with a P/Al atom ratio of 1.2 are generally inactive, with the single exception shown in run 58. Thus, active ctalysts with good melt index potential, e.g. about 0.1 MI or higher, have atom ratios of P/Al ranging from about 0.2:1 to about 1:1.

Figure 2:
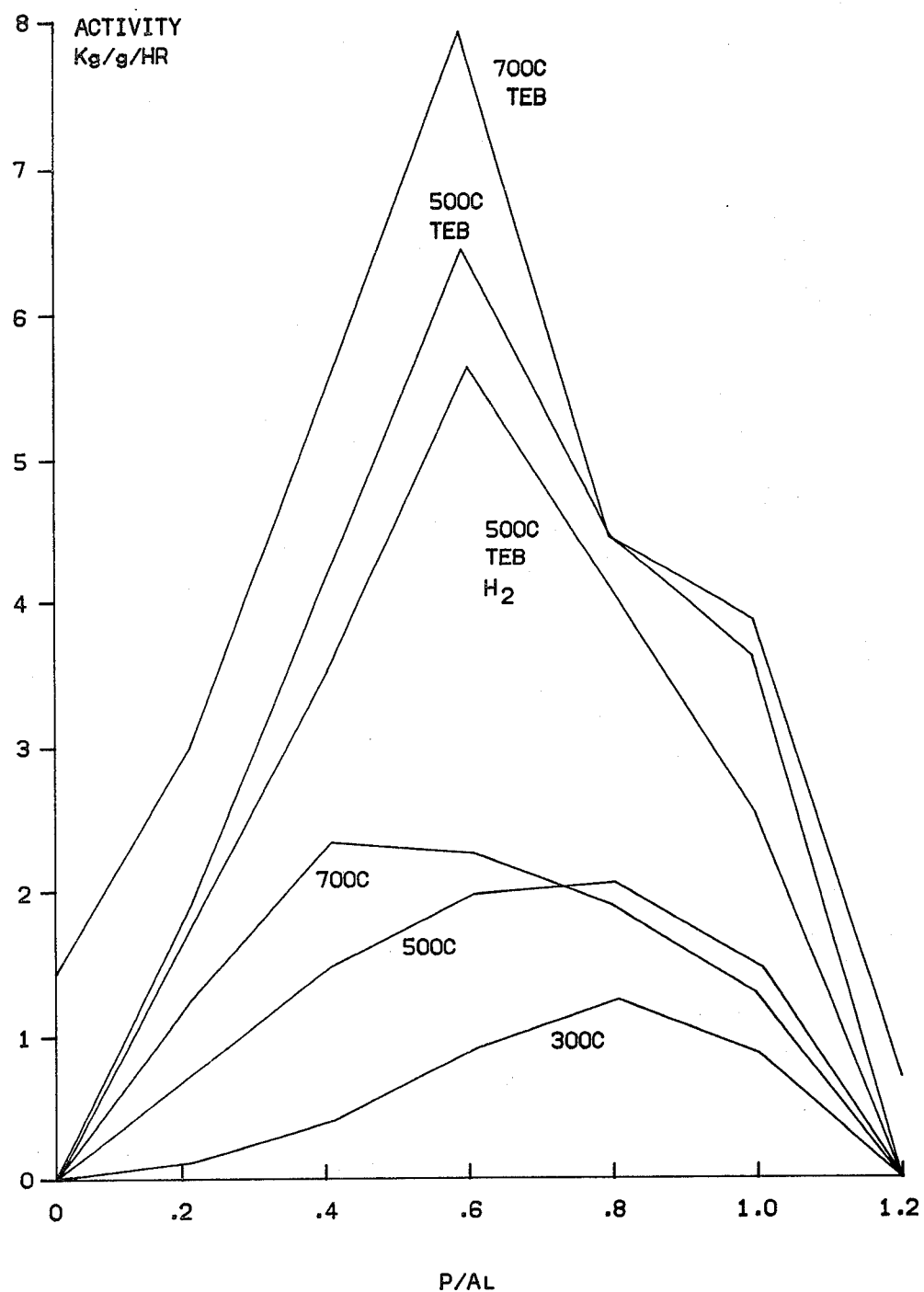
FIG. 2 is a plot similar to FIG. 1 showing the relationship of activity to various activation temperatures.

The calcining temperature is also seen to be one determining factor in the melt index performance of the catalysts. Thus, as the calcining temperature increases from about 300° to about 700° C., the melt index performance generally increases over the preferred P/Al range noted above. This is visually depicted in FIG. 2.

As noted before, the melt index potential of the catalysts is particularly improved when TEB and hydrogen is employed in the polymerization.

EXAMPLE VI

A series of aluminum phosphate gels was prepared by employing Method C and several variations thereof as shown below in which a melt was formed from 94 g (0.25 mole) of $Al(NO_3)_3.9H_2O$, 23 g (0.2 mole) of $NH_4H_2PO_4$, and 2.4 g (0.006 mole) of $CR(NO_3)_3.9H_2O$ by application of gentle heat to give a volume of about 100 mL at a temperature of about 80° C. The calculated P/Al atomic ratio is about 0.8:1. To the melt was added with vigorous stirring, 46 mL (0.72 mole $NH_3$) of concentrated $NH_4OH$ (30 weight percent $NH_3$). The reaction mass at a pH of about 6-7 set to a hard gel, which was thoroughly washed with hot, deionized water and the washed product divided in two approximately equal portions. Portion 1 (catalyst 1 base or support) was dried overnight (about 15 hours) in a vacuum oven at 80° C. Portion 2 (catalyst 2 base) was dried of water by azeotrope distillation with isoamyl alcohol and then the alcohol removed by heating at 60° C. in a vacuum oven.

Catalyst 3 base was prepared in the manner used for catalyst 2 base except that in the gelling step the 100 mL of melt was diluted to 200 mL with water (100 mL water) and to it was added 46 mL of concentrated $NH_4OH$.

Catalyst 4 base was prepared in the manner used for catalyst 2 base except that in the gelling step the 100 mL of melt was diluted to 400 mL with water (300 mL of water) and to it was added 46 mL of concentrated $NH_4OH$.

Catalyst 5 base was prepared in the manner used for catalyst 2 base except that gelling occurred before all the ammonium hydroxide solution was added. The pH was about 3-4 at this stage and the gel was washed and dried as for catalyst 2 base. This shows that the pH during gelling should be about 5 or above.

Catalyst 6 base was prepared by gelling 100 mL of the melt with 46 mL of concentrated ammonium hydroxide as described at the beginning of this Example. The resulting gel was dried overnight in a vacuum oven at 80° C. without removal of the salt by-product.

Catalyst 7 base was prepared in the manner used for catalyst 2 base except that in the gelling step the 100 mL of melt was gelled with a solution of 46 mL of $NH_4OH$ diluted to 100 mL.

A portion of each catalyst base was then activated at 500° C. for 5 hours as before. The surface areas of the recovered, activated catalysts were then determined by the B.E.T. nitrogen sorption method as known in the art.

A portion of each catalyst was tested in ethylene polymerization at 96° C. using 4 ppm TEB as adjuvant in each run.

The surface area of each catalyst and its productivity in terms of grams polymer per g catalyst per hour are given in Table. V.

TABLE V

Ethylene Polymerization With Melt Derived Catalysts

| Run No. | | Catalyst Base | Catalyst Surface Area, $m^2/g$ | Pore Volume, cc/g | Productivity g/g cat/hr | Remarks |
|---|---|---|---|---|---|---|
| 66 | 1 | Invention | 330–380[a] | 0.60 | 2540 | washed, oven dried |
| 67 | 2 | Invention | 330–380[a] | 0.84 | 3955 | washed, azeotrope dried |
| 68 | 3 | Comparative Control | 254 | 0.73 | 3540 | diluted before gelling |
| 69 | 4 | Comparative Control | 223 | 0.39 | 3020 | diluted before gelling |
| 70 | 5 | Control | 493 | 0.51 | dead | gel at acid pH |
| 71 | 6 | Invention | 330–380[a] | 0.74 | 4160 | unwashed, oven dried |
| 72 | 7 | Comparative Control | 269 | | 2485 | diluted before gelling |

[a]Estimated surface area based on similar preparations.

The data presented in Table V indicated that active ethylene polymerization catalysts are derived from melts containing salts of aluminum, chromium and ammonium phosphates that are subsequently gelled by enough ammonium hydroxide to insure that the pH of the mixture is about neutral, that is at least 5, preferably about 6-7. Generally, it will be at least 6. The poor results observed in run 70 shows that a catalyst derived from a gel precipitated at a moderate acid level (pH of about 3-4) yields an inactive catalyst. The good results shown in run 71 demonstrate that in preparing a catalyst base it is not necessary to remove the relatively large amounts of ammonium nitrate present in the gel when made as described. However, care must be exercised in the activation step to prevent or minimize any possible violent reaction that might occur due to the presence of the ammonium nitrate as it is heated.

The results given in run 67 demonstrate that a very active catalyst can be derived from a gel produced in the presence of relatively little water. The reason for this is thought to be that the more concentrated the gel the more physical strength it has. When the water content increases as in the preparation of the gels used in making the catalysts employed in runs 68, 69, and 72, then catalyst activity diminishes. Runs 68, 69 and 72 are labeled comparative control runs relative to runs 66, 67 and 71 to show the advantage for gelling in the melt in the absence of substantial amounts of water on an absolute basis. They are invention runs because they employ a borane cocatalyst.

EXAMPLE VII

In all embodiments of this invention, a mixture of boron-containing cocatalyst as previously defined, preferably trihydrocarbylborane, more preferably trialkylboranes such as tributylborane, and a conventional cocatalyst such as an aluminum, zinc or magnesium alkyl can be used. Suitable aluminum alkyls are known in the art and include materials of the formula $R_3Al$, $R_2AlX$ and $RAlX_2$ and mixtures thereof wherein X is a bromine or chlorine, preferably chlorine and R is a 1 to 10 carbon hydrocarbyl radical, preferably a 2 to 4 carbon atom alkyl, most preferably ethyl. Triethylborane/triethylaluminum, tripropylborane/triethylaluminum and tributylborane/triethylaluminum are especially preferred combinations. Other suitable conventional cocatalysts are $ZnR_2$ and $MgR_2$ wherein R is as defined above.

The boron-containing cocatalyst tends to increase the melt flow whereas the other cocatalyst such as the aluminum alkyls do not. The mixture gives a compromise in melt flow as might be expected, but unexpectedly the mixture does not give a compromise on activity but rather the activity is as good or better than with the boron-containing cocatalyst alone.

Thus use of the mixture allows exceptional activity to be achieved and still allows control over melt index when a polymer having a lower melt index is desired. That is, with no cocatalyst, the activity and melt flow can be too low for a particular application. Use of the boron-containing cocatalyst will increase activity and melt flow which is good but may increase melt flow too much. Adding some of the aluminum cocatalyst allows retention of all of the activity increase (or even a further increase) while removing a part of the melt flow increase. The weight ratio of boron-containing cocatalyst to the other organo metal cocatalyst can vary from 1:10 to 10:1 but will generally be within the range of 3:1 to 1:3. This can be varied to give the exact melt flow desired without adversely affecting activity.

This is shown in Table VI.

TABLE VI

| Run No. | Additive | Activity | MI |
|---|---|---|---|
| 73 | None | 1725 | .20 HLMI |

TABLE VI-continued

| Run No. | Additive | Activity | MI |
|---|---|---|---|
| 74 | 4 ppm TEA | 1885 | .51 HLMI |
| 75 | 8 ppm TEA | 1720 | 1.35 HLMI |
| 76 | 8 ppm TEA + $H_2$ | 1055 | .23 MI |
| 77 | 4 ppm TEB | 3820 | .11 MI |
| 78 | 4 ppm TEB + $H_2$ | 3225 | 5.5 MI |
| 79 | None | 1880 | 1.3 HLMI |
| 80 | 4 ppm TEB + $H_2$ | 2925 | 16.2 MI |
| 81 | 4 ppm TEB + 4 ppm TEA + $H_2$ | 4215 | 3.6 MI |

The aluminum phosphate base of runs 73–78 was made in accordance with Method B (i.e., using the aluminum isopropoxide). the P/Al ratio was 0.8 and the activation temperature was 500° C. The chromium content was 1 weight percent. The aluminum phosphate base of runs 79–81 was made using method C, i.e., from melt and was activated at 700° C. The P/Al ratio was 0.8 and the chromium content was 1 weight percent.

While this invention has been described in detail for the purpose of illustration, it is not to be construed as limited thereby but is intended to cover all changes and modifications within the spirit and scope thereof.

We claim:

1. A polymerization process comprising:
   contacting at least one mono-1-olefin having 2 to 8 carbon atoms per molecule with a catalyst system comprising:
   (a) a catalyst comprising a chromium compound on a predominantly amorphous aluminum phosphate containing xerogel base which catalyst has been activated in an oxidizing ambient;
   (b) a cocatlyst comprising a boron compound selected from trihydrocarbyl boron compounds, boron alkoxides, and mixtures thereof; and
   recovering a polymer.

2. A process according to claim 1 wherein said at least one mono-1-olefin is selected from ethylene, propylene, 1-butene, 1-pentene, 1-hexene and 1-octene and said polymerization is carried out under slurry conditions.

3. A process according to claim 2 wherein said at least one mono-1-olefin comprises ethylene and said polymerization conditions include a temperature of 205° F.±5° F.

4. A process according to claim 2 wherein said cocatalyst is added to a reaction zone containing said at least one mono-1-olefin as a separate stream from the catalyst.

5. A process according to claim 1 wherein an essentially ethylene homopolymer having a melt index of greater than 0.1 is produced by incorporating 0.001 to 0.3 mole percent comonomer in an essentially pure ethylene feed.

6. A process according to claim 5 wherein 0.01 to 0.1 mole percent of one of propylene, 1-butene, 1-pentene, 1-hexene or 1-octene is in the feed.

7. A process according to claim 1 wherein an atom ratio of phosphorus to aluminum in said catalyst system is within the range of 0.2:1 to 1:1.

8. A process according to claim 1 wherein an atom ratio of phosphorus to aluminum in said catalyst system is within the range of 0.6:1 to 0.9:1.

9. A process according to claim 1 wherein said boron compound is a trialkylborane.

10. A process according to claim 1 wherein said boron compound is one of triethylborane, tripropylborane and tributylborane.

11. A process according to claim 1 wherein said boron compound is tri-n-butylborane.

12. A process according to claim 1 wherein said catalyst is present in an amount sufficient to give an atom ratio of boron to chromium within the range of 2:1 to 10:1.

13. A process according to claim 1 wherein the chromium of said chromium compound is present in an amount within the range of 0.1 to 5 weight percent based on the weight of the xerogel base and wherein said catalyst has been activated in air at a temperature of 300°–600° C.

14. A process according to claim 1 wherein said predominantly amorphous aluminum phosphate base is formed in the presence of 1 to 30 mole percent of a boron compound based on the moles of phosphate.

15. A process according to claim 1 wherein said aluminum phosphate is prepared by combining a source of phosphate ions with a hydrated molten aluminum salt and then neutralizing by mixing with a base.

16. A process according to claim 1 wherein said cocatalyst contains in addition an aluminum, zinc or magnesium alkyl.

17. A process according to claim 1 wherein said cocatalyst is a mixture of a trialkylborane and a trialkylaluminum.

18. A process according to claim 17 wherein said trialkylborane is one of triethylborane, tripropylborane and tributylborane and said trialkylaluminum is triethylaluminum.

19. A process according to claim 1 wherein the chromium in said catalyst system is at least predominantly in the hexavalent state.

20. A polymerization process comprising:
contacting at least one mono-1-olefin having 2 to 8 carbon atoms per molecule in a reaction zone under polymerization conditions with a catalyst comprising;
an oxidized chromium compund on a predominantly amorphous aluminum phosphate base prepared by combining a melt of an aluminum salt and a source of phosphate ions and neutralizing with a base so as to case gellation; and
recovering a polymer.

* * * * *

UNITED STATES PATENT AND TRADEMARK OFFICE
CERTIFICATE OF CORRECTION

PATENT NO. : 4,444,964

DATED : April 24, 1984

INVENTOR(S) : Max P. McDaniel and Marvin M. Johnson

It is certified that error appears in the above-identified patent and that said Letters Patent are hereby corrected as shown below:

Column 20, line 35, claim 1, line 9 "cocatlyst" should be --- cocatalyst ---

Column 22, line 24, claim 20, line 10 "case" should be --- cause ---.

Signed and Sealed this

Ninth Day of September 1986

[SEAL]

Attest:

Attesting Officer

DONALD J. QUIGG

Commissioner of Patents and Trademarks